United States Patent
Yamaguchi et al.

(10) Patent No.: US 6,722,457 B2
(45) Date of Patent: Apr. 20, 2004

(54) HYBRID VEHICLE AND CONTROL METHOD THEREOF

(75) Inventors: Kozo Yamaguchi, Anjo (JP); Hideki Hisada, Anjo (JP); Kazuo Aoki, Anjo (JP); Toshio Okoshi, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 248 days.

(21) Appl. No.: 09/984,217

(22) Filed: Oct. 29, 2001

(65) Prior Publication Data

US 2002/0079147 A1 Jun. 27, 2002

(30) Foreign Application Priority Data

Dec. 27, 2000 (JP) ......................................... 2000-397249

(51) Int. Cl.[7] .............................. B60K 6/00; B60K 1/00; G06F 7/00; F02N 17/00
(52) U.S. Cl. .................... 180/65.2; 180/65.3; 180/65.4; 701/22; 123/179.3
(58) Field of Search .............................. 180/65.2, 65.3, 180/65.4, 65.6, 65.8; 701/22, 70; 123/3, 179.3, 179.1, 179.4; 477/99

(56) References Cited

U.S. PATENT DOCUMENTS

| | | | | |
|---|---|---|---|---|
| 4,335,429 | A | * | 6/1982 | Kawakatsu .................. 364/424 |
| 5,698,905 | A | * | 12/1997 | Ruthlein et al. .............. 290/32 |
| 5,865,263 | A | | 2/1999 | Yamaguchi et al. |
| 5,934,395 | A | | 8/1999 | Koide et al. |
| 6,253,127 | B1 | * | 6/2001 | Itoyama et al. ................ 701/22 |
| 6,490,511 | B1 | * | 12/2002 | Raftari et al. .................. 701/22 |
| 6,494,277 | B1 | * | 12/2002 | Boggs et al. ............. 180/65.2 |
| 6,542,798 | B2 | * | 4/2003 | Kotre et al. .................. 701/22 |
| 6,581,705 | B2 | * | 6/2003 | Phillips et al. ............. 180/65.2 |
| 2002/0068998 | A1 | * | 6/2002 | Boggs et al. ................. 701/22 |

FOREIGN PATENT DOCUMENTS

| | | |
|---|---|---|
| JP | A 6-261419 | 9/1994 |
| JP | B2 3045019 | 3/2000 |
| JP | B2 3171073 | 3/2001 |

\* cited by examiner

*Primary Examiner*—Brian L. Johnson
*Assistant Examiner*—G B Klebe
(74) *Attorney, Agent, or Firm*—Oliff & Berridge, PLC (57) ABSTRACT

A hybrid vehicle includes an engine and a first electric motor mechanically connected to the engine and to a drive wheel. The engine is startable by the first electric motor. The hybrid vehicle further includes: start condition satisfaction determination processing system and method for determining whether a variable that varies corresponding to the rotation of the drive wheel is equal to or greater than a threshold set within a range that does not exceed an upper limit value prescribed by a maximum torque of the first electric motor and a torque of the first electric motor needed to start the engine; and engine start instruction output processing system and method for outputting an engine start instruction if the variable is equal to or greater than the threshold. If the variable is greater than or equal to the threshold, the engine start instruction is outputted, and the engine is immediately started.

6 Claims, 7 Drawing Sheets

HYBRID VEHICLE AND CONTROL METHOD THEREOF

BACKGROUND OF THE INVENTION

1. Field of Invention

The invention relates to a hybrid vehicle and a control method thereof.

2. Description of Related Art

A conventional hybrid vehicle described in Japanese Patent Application Laid-Open No. HEI 11-315735 has a planetary gear unit that includes a sun gear, a ring gear and a carrier. The carrier is connected to an engine. The ring gear is connected to a drive wheel. The sun gear is connected to a generator motor. Rotation outputted from the ring gear and a drive motor is transferred to the drive wheel so as to produce drive force.

In this type of hybrid vehicle, in a low-rotation speed region, the drive motor torque, is greater than the engine torque. Therefore, at the time of starting the vehicle, only the drive motor is driven and the driving of the engine is stopped, so that the hybrid vehicle is run in a motor drive mode. During this operation, the generator motor is passively turned. When after the vehicle starts, the vehicle speed reaches an engine start vehicle speed Ve that is suitable for starting the engine, the engine is started by driving the generator motor to raise the engine revolution speed, to a revolution speed suitable for ignition (hereinafter, referred to as "ignition revolution speed"). After that, the drive motor and the engine are driven, and the hybrid vehicle is run in a motor-engine drive mode.

When a vehicle speed of the conventional hybrid vehicle is low, the generator motor is passively turned at a low speed, so that a generator motor torque that is sufficient to raise the engine revolution speed to the ignition revolution speed can be produced. However, when the vehicle speed is high, the generator motor is passively turned at a high speed, so that a sufficient generator motor torque cannot be produced due to the characteristic of the generator motor. As a result, the engine revolution speed cannot be raised to the ignition revolution speed. In that case, the engine cannot be started.

SUMMARY OF THE INVENTION

It is an object of the invention to solve the aforementioned problem of the conventional hybrid vehicle and to provide a hybrid vehicle and a control method thereof capable of reliably starting an engine.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF PREFERRED EMBODIMENTS

Preferred embodiments of the invention will be described hereinafter in detail with reference to the drawings.

Figure 1:
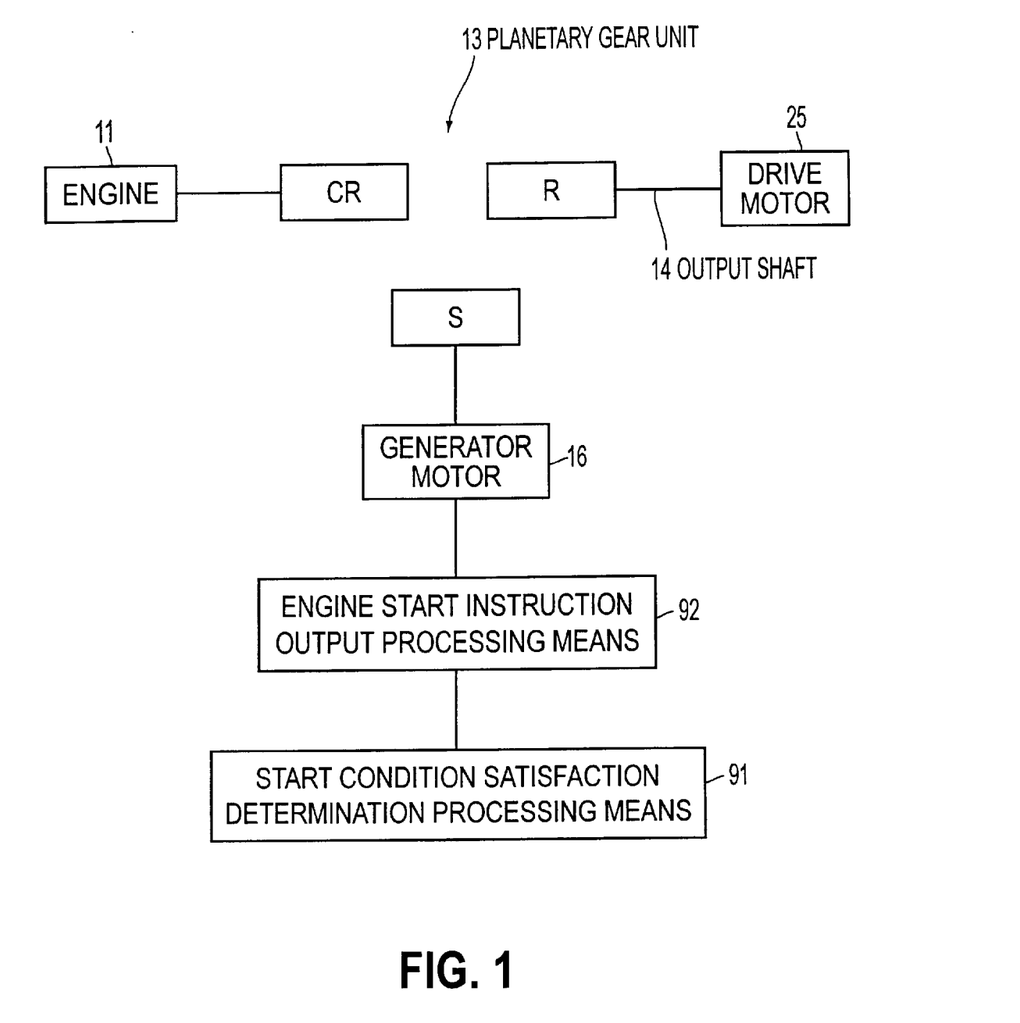
FIG. 1 is a function block diagram of a hybrid vehicle in accordance with an embodiment of the invention.

FIG. 1 is a function block diagram of a hybrid vehicle in accordance with an embodiment of the invention.

In FIG. 1, reference numeral 11 represents an engine; 16 represents a generator motor as an electric motor; 14 represents an output shaft connected to a drive wheel (not shown); 13 represents a planetary gear unit as a differential gear device including at least three gear elements, a sun gear S, a ring gear R and a carrier CR wherein the sun gear S, the ring gear R and the carrier CR are connected to the generator motor 16, the output shaft 14 and the engine 11, respectively; 91 represents a start condition satisfaction determination processing means for determining whether a variable that varies corresponding to the rotation of the output shaft 14 is greater than or equal to a threshold set within a range that does not exceed an upper limit value prescribed by the maximum torque of the generator motor 16 and a torque of the generator motor 16 needed to start the engine 11; and 92 represents an engine start instruction output processing means for outputting an engine start instruction if the variable is greater than or equal to the threshold. Furthermore, 25 represents a drive motor as a second electric motor.

Figure 2:
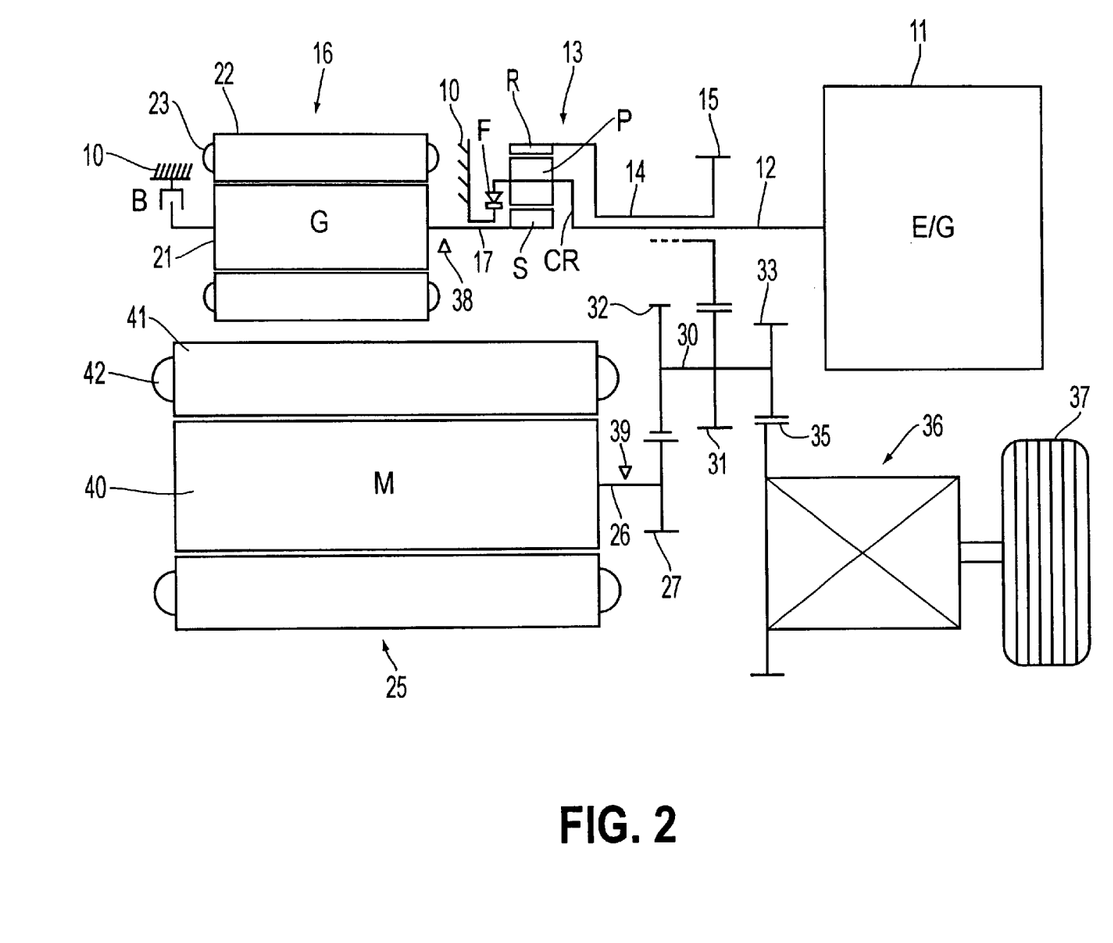
FIG. 2 is a conceptual diagram of a hybrid vehicle in accordance with the embodiment of the invention.

FIG. 2 is a conceptual diagram of a hybrid vehicle in accordance with the embodiment of the invention. In the drawing, reference numeral 11 represents the engine (E/G) disposed on a first axis; 12 represents an output shaft disposed on the first axis for outputting the rotation produced by driving the engine 11; 13 represents the planetary gear unit as a differential gear device disposed on the first axis for changing the speed of rotation inputted thereto via the output shaft 12; 14 represents the output shaft disposed on the first axis for outputting rotation after the speed of rotation has been changed by the planetary gear unit 13; 15 represents a first counter drive gear as an output gear fixed to the output shaft 14; and 16 represents the generator motor (G) as a first electric motor that is disposed on the first axis, and that is connected to the planetary gear unit 13 via a transfer shaft 17 disposed on the first axis as well, and that is mechanically connected to the engine 11.

The output shaft 14 has a sleeve-like shape, and is disposed around the output shaft 12. The first counter drive gear 15 is disposed at an engine 11-side of the planetary gear unit 13.

The planetary gear unit 13 includes at least the sun gear S as a first gear element, pinions P meshed with the sun gear S, the ring gear R as a second gear element meshed with the pinions P, and the carrier CR as a third gear element that rotatably supports the pinions P. The sun gear S is connected to the generator motor 16 via the transfer shaft 17. The ring gear R is connected to a drive wheel 37 and to a drive motor 25(M) that is disposed on a second axis parallel to the first axis and that is mechanically interconnected with the generator motor 16, via the output shaft 14 and a certain gear train. The carrier CR is connected to the engine 11 via the output shaft 12. A one-way clutch F is disposed between the carrier CR and a casing 10 of a drive apparatus. The one-way clutch F becomes free when forward rotation is transferred from the engine 11 to the carrier CR. When reverse rotation is transferred to the carrier CR from the generator motor 16 or the drive motor 25, the one-way clutch F is locked to prevent reverse rotation from being transferred to the engine 11.

The generator motor 16 is made up of a rotor 21 fixed to the transfer shaft 17 so as to be freely rotatable, a stator 22 disposed around the rotor 21, and a coil 23 formed on the stator 22. The generator motor 16 generates electric power from rotation transferred thereto via the transfer shaft 17. The coil 23 is connected to a battery (not shown), and supplies DC current to the battery. A brake B is disposed between the rotor 21 and the casing 10. By engaging the brake B, the rotor 21 can be fixed to stop rotation of the generator motor 16.

Furthermore, reference numeral 26 represents an output shaft which is disposed on the second axis and to which rotation of the drive motor 25 is outputted; and 27 represents a second counter drive gear as an output gear fixed to the output shaft 26. The drive motor 25 is made up of a rotor 40 fixed to the output shaft 26 so that the rotor 40 is rotatable, a stator 41 disposed around the rotor 40, and a coil 42 formed on the stator 41.

The drive motor 25 produces drive motor torque from current supplied to the coil 42. To that end, the coil 42 is connected to the battery, and is supplied with AC current converted from DC current from the battery. The generator motor 16, the drive motor 25 and the drive wheel 37 are mechanically connected.

In order to turn the drive wheel 37 in the same rotating direction as the engine 11, a counter shaft 30 is disposed on a third axis parallel to the first and second axes. Fixed to the counter shaft 30 are a first counter driven gear 31 and a second counter driven gear 32 that has more teeth than the first counter driven gear 31. The first counter driven gear 31 and the first counter drive gear 15 are meshed. The second counter driven gear 32 and the second counter drive gear 27 are meshed. Thus, rotation of the first counter drive gear 15 is transferred to the first counter driven gear 31 while rotation is reversed. Rotation of the second counter drive gear 27 is transferred to the second counter driven gear 32 while rotation is reversed.

Also fixed to the counter shaft 30 is a differential pinion gear 33 that has fewer teeth than the first counter driven gear 31.

A differential apparatus 36 is disposed on a fourth axis parallel to the first to third axes. A differential ring gear 35 of the differential apparatus 36 is meshed with the differential pinion gear 33. Therefore, rotation transferred to the differential ring gear 35 is distributed by the differential apparatus 36, and is transferred to the drive wheel 37. In FIG. 2, reference numeral 38 represents a generator motor rotation speed sensor for detecting the rotation speed of the generator motor 16, that is, the generator motor rotation speed NG; and 39 represents a drive motor rotation speed sensor for detecting the rotation speed of the drive motor 25, that is, the drive motor rotation speed NM.

Thus, rotation produced by the engine 11 can be transferred to the first counter driven gear 31. Furthermore, rotation produced by the drive motor 25 can be transferred to the second counter driven gear 32. Therefore, by driving the engine 11 and the drive motor 25, the hybrid vehicle can be run.

Next described will be an operation of the planetary gear unit 13.

Figure 3:
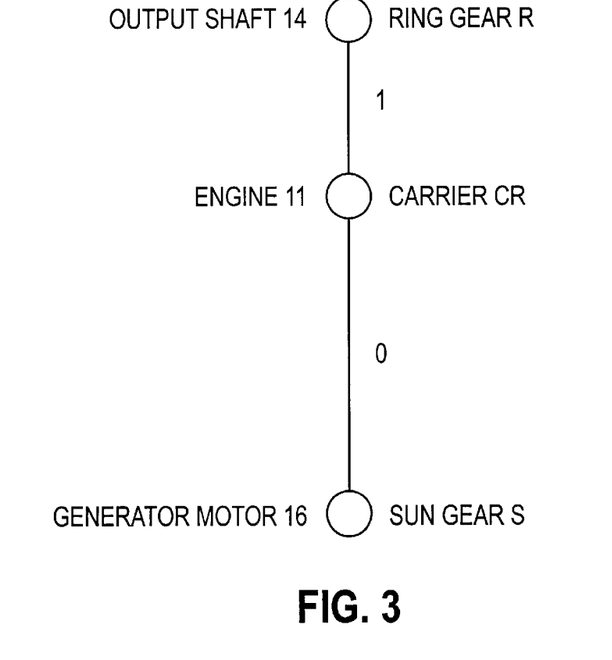
FIG. 3 is a diagram illustrating operation of a planetary gear unit in accordance with the embodiment of the invention.
Figure 4:
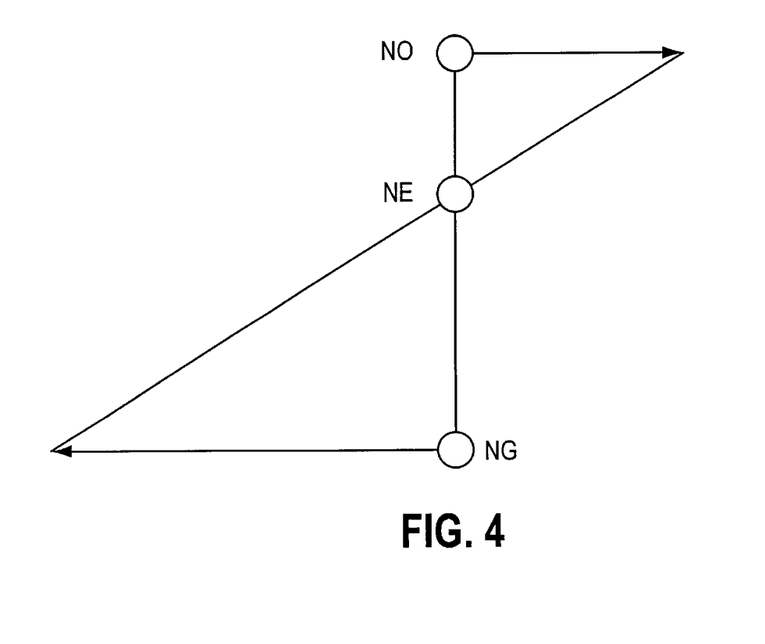
FIG. 4 is a vehicle speed diagram in accordance with the embodiment of the invention.

FIG. 3 is a diagram illustrating an operation of the planetary gear unit in accordance with the embodiment of the invention. FIG. 4 is a vehicle speed diagram in accordance with the embodiment of the invention.

As shown in FIG. 2, in the planetary gear unit 13 (FIG. 2), the carrier CR and the sun gear S are connected to the engine 11 and the generator motor 16, respectively, and the ring gear R is connected to the drive motor 25 and the drive wheel 37 via the output shaft 14. Therefore, the rotation speed of the ring gear R equals the rotation speed outputted to the output shaft 14, that is, the output rotation speed NO. Furthermore, the rotation speed of the carrier CR equals the revolution speed of the engine 11, that is, the engine revolution speed NE, and the rotation speed of the sun gear S equals the generator motor rotation speed NG. If the number of teeth of the ring gear R is $\rho$ times the number of teeth of the sun gear S (in this embodiment, twice the number of teeth of the sun gear S), a relationship holds as follows:

$$(\rho+1) \cdot NE = 1 \cdot NE + \rho \cdot NO$$

Therefore, on the basis of the output rotation speed NO and the generator motor rotation speed NG, the engine revolution speed NE can be calculated as in:

$$NE = (1 \cdot NG + \rho \cdot NO)/(\rho+1) \tag{1}$$

The torque produced by the engine 11, that is, the engine torque TE, and the torque produced on the output shaft 14, that is, the output torque TO, and the torque produced by the generator motor 16, that is, the generator motor torque TG have the following relationship:

$$TE:TO:TG = (\rho+1):\rho:1 \tag{2}$$

Thus, the engine torque TE, the output torque TO and the generator motor torque TG are affected by reaction forces from one another.

Next described will be a control apparatus of the hybrid vehicle constructed as described above.

Figure 5:
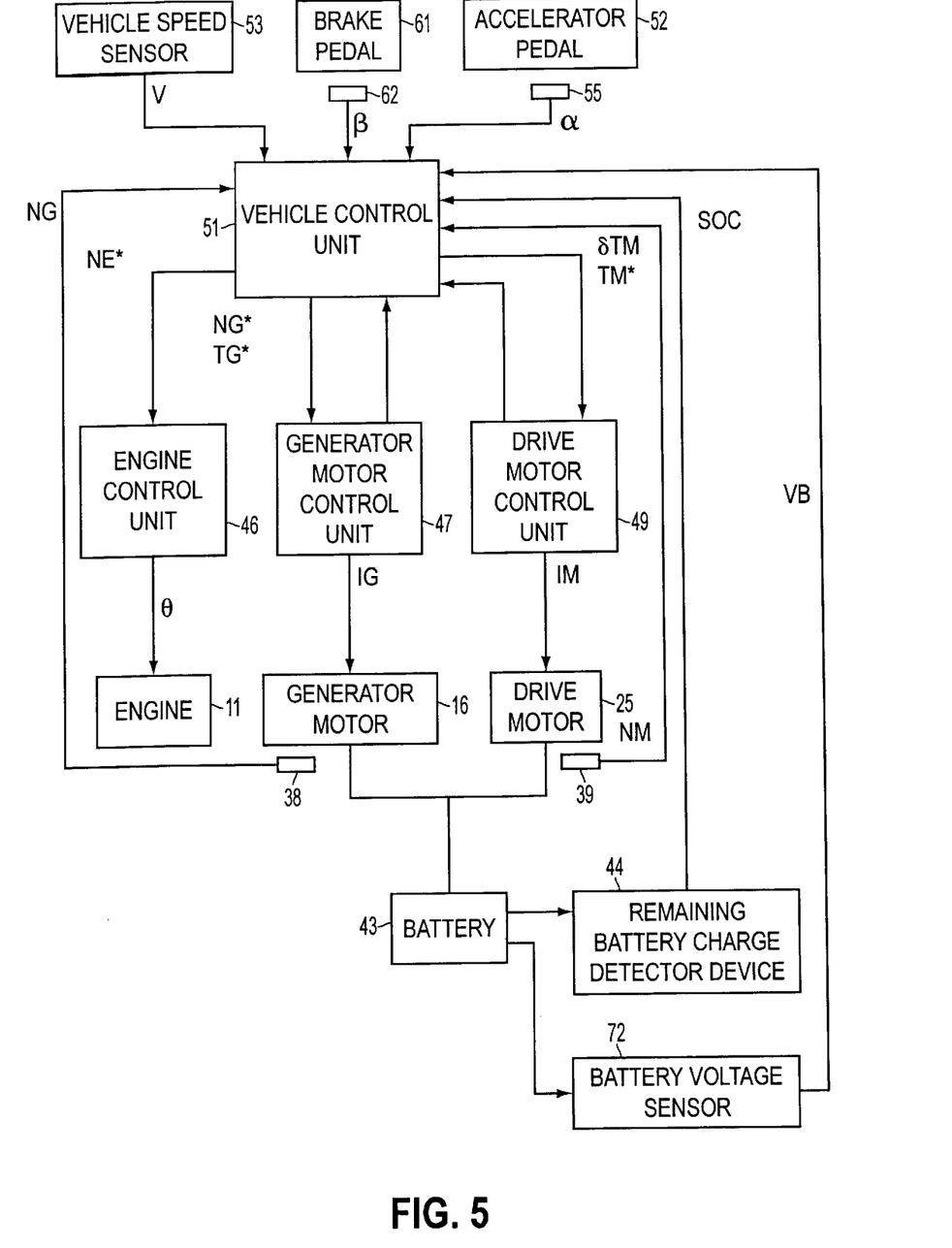
FIG. 5 is a block diagram illustrating a control unit of the hybrid vehicle in accordance with the embodiment of the invention.

FIG. 5 is a block diagram illustrating a control unit of the hybrid vehicle in accordance with the embodiment of the invention.

In FIG. 5, reference numeral 11 represents the engine; 16 represents the generator motor; 25 represents the drive motor; and 43 represents the battery. Reference numeral 46 represents an engine control unit as an engine control means for controlling the engine 11. The engine control unit 46 sends to the engine 11 an instruction signal such as a degree of throttle opening θ or the like. Reference numeral 47 represents the generator motor control unit as a generator motor control means for controlling the generator motor 16. The generator motor control unit 47 sends a current instruction value IG to the generator motor 16. Reference numeral 49 represents a drive motor control unit as a drive motor control means for controlling the drive motor 25. The drive motor control unit 49 sends a current instruction value IM to the drive motor 25.

Reference numeral 51 represents a vehicle control unit made up of a CPU, a recording device, etc. (which are not shown) for performing overall control of the hybrid vehicle; 44 represents a remaining battery charge detector device for detecting the remaining amount of battery charge SOC as a state of the battery 43; 52 represents an accelerator pedal; 53 represents a vehicle speed sensor for detecting the vehicle speed V; 55 represents an accelerator switch as an accelerator operation amount detecting means for detecting the amount of depression of the accelerator pedal 52, that is, the accelerator operation amount α; 61 represents a brake pedal; 62 represents a brake switch as a brake operation detecting means for detecting the amount of depression of the brake pedal 61; 38 represents a generator motor rotation speed sensor for detecting the generator motor rotation speed NG; 39 represents a drive motor rotation speed sensor for detecting the drive motor rotation speed NM; and 72 represents a battery voltage sensor for detecting the battery voltage VB as a state of the battery 43. The remaining battery charge detector device 44 and the battery voltage sensor 72 form a battery state detecting means.

The vehicle control unit 51 sets the driving and stopping of the engine 11 by sending control signals to the engine control unit 46, and reads the generator motor rotation speed NG and the drive motor rotation speed NM to calculate the engine revolution speed NE based on the equation (1), and sets a target value of the engine revolution speed NE, that is, a target engine revolution speed NE*, in the engine control unit 46, and sets a target value of the generator motor rotation speed NG, that is, a target generator motor rotation speed NG*, and a target value of the generator motor torque TG, that is, a target generator motor torque TG*, in the generator motor control unit 47, and sets a target value of the drive motor torque TM, that is, a target drive motor torque TM*, and a drive motor torque correction value δTM in the drive motor control unit 49.

Although in this embodiment, the vehicle control unit 51 calculates the engine revolution speed NE, it is also possible to detect the engine revolution speed NE through the use of an engine revolution speed sensor (not shown). Furthermore, although in the embodiment, the vehicle speed V is detected based on the output rotation speed NO, the vehicle speed V may also be detected based on the rotation speed of the ring gear R, the rotation speed of the drive wheel 37 (FIG. 2), etc.

Next described will be an operation of the hybrid vehicle constructed as described above.

Figure 6:
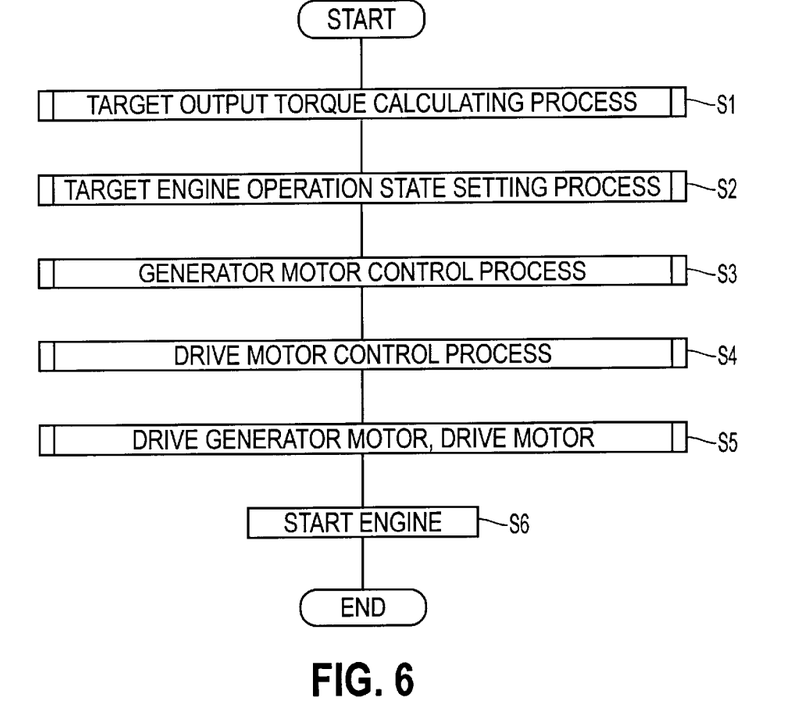
FIG. 6 is a main flowchart illustrating an operation of the hybrid vehicle in accordance with the embodiment of the invention.
Figure 7:
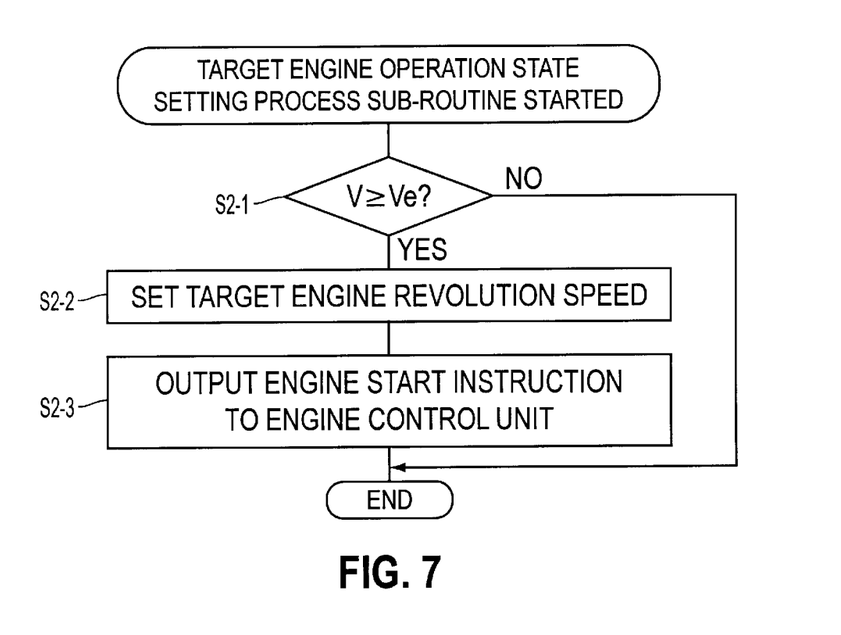
FIG. 7 is a chart illustrating a sub-routine of a target engine operation state setting process in accordance with the embodiment of the invention.
Figure 8:
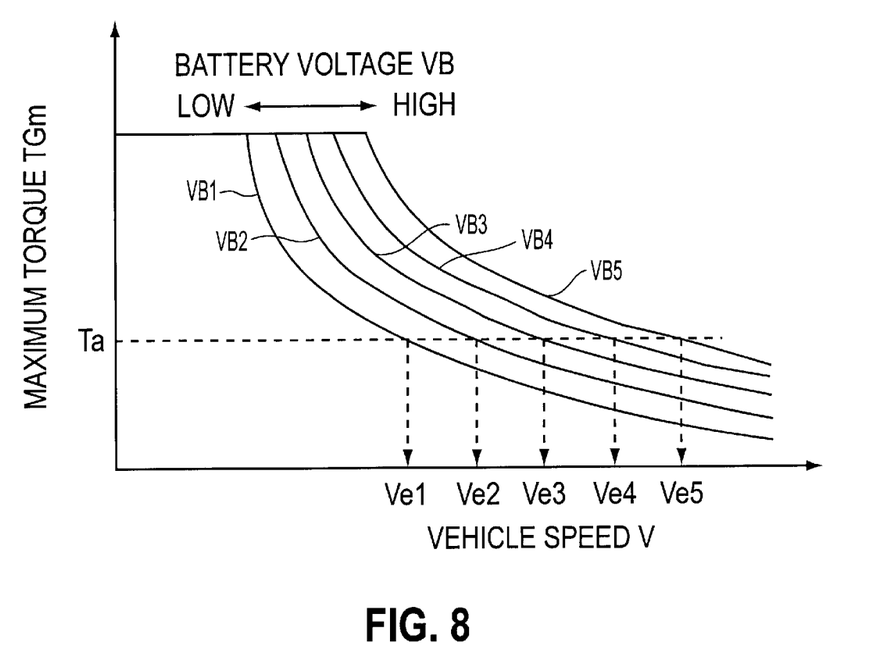
FIG. 8 is a diagram indicating a relationship between the engine start vehicle speed and the maximum torque of the generator motor in accordance with the embodiment of the invention.
Figure 9:
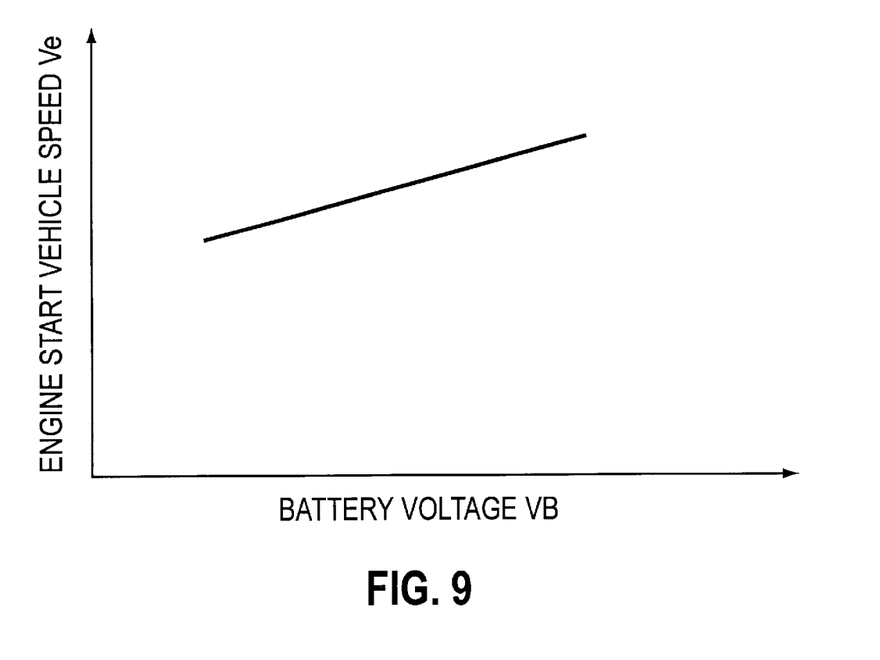
FIG. 9 is a diagram indicating an engine start vehicle speed map in accordance with the embodiment of the invention.

FIG. 6 is a main flowchart illustrating an operation of the hybrid vehicle in accordance with the embodiment of the invention. FIG. 7 is a chart illustrating a sub-routine of a target engine operation state setting process in accordance with the embodiment of the invention. FIG. 8 is a diagram indicating a relationship between the engine start vehicle speed and the maximum torque of the generator motor in accordance with the embodiment of the invention. FIG. 9 is a diagram indicating an engine start vehicle speed map in accordance with the embodiment of the invention. In FIG. 8, the abscissa axis represents the vehicle speed V, and the ordinate axis represents the maximum torque TGm. In FIG. 9, the abscissa axis represents the battery voltage VB, and the ordinate axis represents the engine start vehicle speed Ve.

First, a target output torque calculation processing means (not shown) of the vehicle control unit 51 (FIG. 5) performs a target output torque calculating process as follows. The means reads the vehicle speed V detected by the vehicle speed sensor 53, and the degree of throttle opening θ sent from the engine control unit 46. The means calculates a vehicle drive force Q needed to run the hybrid vehicle that is predetermined corresponding to the vehicle speed V and the degree of throttle opening θ, with reference to a first vehicle drive force (not shown) if the accelerator pedal 52 is depressed, and with reference to a second vehicle drive force map (not shown) if the brake pedal 61 is depressed. On the basis of the calculated vehicle drive force Q, the means calculates a target output torque TO*. The target output torque TO* is calculated based on the vehicle drive force Q, and the gear ratio GO of a torque transfer system from the output shaft 14 (FIG. 2) to the drive wheel 37.

In a low-rotation speed region, the drive motor torque TM is greater than the engine torque TE, so that at the time of vehicle start, only the drive motor 25 is driven and the driving of the engine 11 is stopped. Thus, the hybrid vehicle is run in a motor drive mode. During this operation, the generator motor 16 is passively turned. When after the vehicle starts, the vehicle speed V becomes equal to or greater than an engine start vehicle speed Ve that is a threshold suitable for starting the engine 11, the engine 11 is started by driving the generator motor 16 to raise the engine revolution speed NE to an ignition revolution speed Nf suitable for ignition. After that, the drive motor 25 and the engine 11 are driven, and the hybrid vehicle is run in a motor-engine drive mode. The vehicle speed V changes corresponding to the rotation of the output shaft 14, and is a variable proportional to the output rotation speed NO.

The start condition satisfaction determination processing means 91 of the vehicle control unit 51 performs a start condition satisfaction determining process. The means reads the vehicle speed V and the battery voltage VB, and reads the engine start vehicle speed Ve corresponding to the battery voltage VB with reference to the engine start vehicle speed map of FIG. 9. Subsequently, the start condition satisfaction determination processing means 91 determines whether a starting condition is satisfied, based on whether the vehicle speed V is greater than the engine start vehicle speed Ve. If the starting condition is met, that is, if the vehicle speed V is greater than the engine start vehicle speed Ve, the engine start instruction output processing means 92 of the vehicle control unit 51 performs an engine start instruction outputting process. To that end, a target engine operation state setting processing means (not shown) of the engine start instruction output processing means 92 performs a target engine operation state setting process. By referring to a target engine operation state map (not shown), the target engine operation state setting processing means sets, as a target engine operation state, an engine operation point of a good efficiency among various engine operation points. The means sets the engine revolution speed NE in the target engine operation state as a target engine revolution speed NE*, and sends the target engine revolution speed NE* to the engine control unit 46, and sets the target engine revolution speed NE*. Then, the engine start instruction output processing means 92 outputs an engine start instruction to the engine control unit 46.

The maximum torque TGm of the generator motor torque TG increases with decreases in the vehicle speed V, and decreases with increases in the vehicle speed V, as indicated in FIG. 8. Furthermore, the maximum torque TGm increases with increases in the battery voltage VB, and decreases with decreases in the battery voltage VB. Therefore, the engine 11 needs to be started when the maximum torque TGm is equal to or greater than a value Ta of the generator motor torque TG needed to start the engine 11, that is, the generator motor torque TG needed to raise the engine revolution speed NE to the ignition revolution speed Nf. Therefore, separately for various battery voltages VB, vehicle speeds V at which the maximum torque TGm becomes equal to or greater than the value Ta are set as engine start vehicle speeds Ve. In this case, for example, in FIG. 8, the vehicle speeds V at points of intersection of lines indicating the maximum torque TGms for battery voltages VB1 to VB5 and a line indicating the value Ta are determined as upper limit values Ve1 to Ve5 of the engine start vehicle speed Ve. The engine start vehicle speed Ve is set within a range in which the upper limit value Ve1 to Ve5 is not exceeded. Therefore, as indicated in FIG. 9, the engine start vehicle speed Ve is changed corresponding to the battery voltage VB, that is, the engine start vehicle speed Ve is increased with increases in the battery voltage VB, and is decreased with decreases in the battery voltage VB.

Although in the embodiment, the start condition satisfaction determination processing means 91 reads the battery voltage VB and reads the engine start vehicle speed Ve corresponding to the battery voltage VB, it is also possible to read a remaining amount of battery charge SOC instead of the battery voltage VB, and to read an engine start vehicle speed Ve corresponding to the remaining amount of battery charge SOC. In that case, the remaining amount of battery charge SOC and the engine start vehicle speed Ve are set in correspondence to each other in the engine start vehicle speed map, wherein the engine start vehicle speed Ve is increased with increases in the remaining amount of battery charge SOC, and is decreased with decreases in the remaining amount of battery charge SOC.

Subsequently, a generator motor control processing means (not shown) of the vehicle control unit 51 performs a generator motor control process to calculate a target generator motor rotation speed NG*. To that end, the generator motor control processing means reads the vehicle speed V, and calculates an output rotation speed NO from the vehicle speed V and the gear ratio GO as in the following equation:

$$NO = V \cdot GO \qquad (3)$$

A target generator motor rotation speed setting processing means (not shown) of the generator motor control processing means performs a target generator motor rotation speed setting process. On the basis of the target engine revolution speed NE* and the output rotation speed NO, the means calculates a target generator motor rotation speed NG* as in an equation below. The means then sends the target generator motor rotation speed NG* to the generator motor control unit 47, and sets it in the generator motor control unit 47.

$$NG^* = NO - (NO - NE^*) \cdot (1+\rho)/\rho \qquad (4)$$

When at least one of the engine 11 and the generator motor 16 is driven, at least one of the engine torque TE and the generator motor torque TG is outputted from the ring gear R as a ring gear torque TR. If the ring gear torque TR is directly transferred to the drive wheel 37, the drive feel of the hybrid vehicle deteriorates. Therefore, when the output shaft 26 is driven, the drive motor torque TM is corrected by the amount of ring gear torque TR.

Whereas it is difficult to determine the engine torque TE, the generator motor torque TG can be calculated based on the generator motor rotation speed NG, and therefore can easily be determined. Therefore, a generator motor torque calculating means (not shown) of the generator motor control unit 47 calculates a generator motor torque TG corresponding to the generator motor rotation speed NG with reference to a generator motor torque map (not shown), and sends the generator motor torque TG to the vehicle control unit 51. Then, a drive motor control processing means (not shown) of the vehicle control unit 51 performs a drive motor control process. A drive motor torque correction value calculation processing means of the drive motor control processing means calculates a drive motor torque correction value δTM based on the generator motor torque TG received from the generator motor control unit 47, the ratio of the number of teeth of the second counter drive gear 27 to the number of teeth of the sun gear S, that is, the gear ratio γ1 between the generator motor 16 and the drive motor 25. Then, the means sends the drive motor torque correction value δTM together with the target drive motor torque TM* to the drive motor control unit 49.

In this case, the drive motor torque correction value δTM is calculated as follows.

That is, the sun gear torque TS exerted on the sun gear S can be expressed by:

$$TS = TG + InG \cdot \alpha G \qquad (5)$$

where InG is the inertia of the generator motor 16, and αG is the angular acceleration (rotation changing rate) of the generator motor 16. Since the angular acceleration αG is very small, it is possible to make an approximation in which the sun gear torque TS and the generator motor torque TG equal teach other:

$$TS = TG \qquad (6)$$

Assuming that the number of teeth of the ring gear R is 2 times the number of teeth of the sun gear S, the ring gear torque TR is ρ times the sun gear torque TS.

Assuming that the counter gear ratio, that is, the ratio of the number of teeth of the second counter drive gear 27 to the number of teeth of the second counter driven gear 32 is i, the drive motor torque correction value δTM can be expressed as in:

$$\delta TM = \rho \cdot TS \cdot i$$
$$= \rho \cdot TG \cdot i \qquad (7)$$

Since the gear ratio γ1 is written as:

$$\gamma 1 = \rho \cdot i \qquad (8)$$

the drive motor torque correction value δTM can be written as:

$$\delta TM = \gamma 1 \cdot TG \qquad (9)$$

Next, a target drive motor torque calculating means (not shown) of the drive motor control processing means calculates a target drive motor torque TM* corresponding to the acceleration operation amount α and the vehicle speed V without consideration of torque fluctuation, with reference to a target drive motor torque map (not shown). The means then sends the target drive motor torque TM* to the drive motor control unit 49, and sets the target drive motor torque TM*.

Subsequently, the engine control unit 46, the generator motor control unit 47 and the drive motor control unit 49 drive the engine 11, the generator motor 16 and the drive motor 25, respectively. A current instruction value generation processing means of the generator motor control unit 47 performs a current instruction value generating process as follows. Upon receiving the target generator motor rotation speed NG* from the vehicle control unit 51, the means generates a current instruction value IG such that a deviation ΔNG between the generator motor rotation speed NG and the target generator motor rotation speed NG* becomes equal to "0", and sends the current instruction value IG to the generator motor 16 so as to correspondingly drive the generator motor 16. Thus, a rotation speed control of the generator motor 16 is performed.

Then, a drive motor torque instruction value calculating means (not shown) of the drive motor control unit 49, upon receiving the target drive motor torque TM* and the drive motor torque correction value δTM from the vehicle control unit 51, subtracts the drive motor torque correction value δTM from the target drive motor torque TM* to determine a drive motor torque instruction value STM* as follows:

$$STM^* = TM^* - \delta TM \tag{10}$$

Subsequently, a current instruction value generation processing means (not shown) of the drive motor control unit 49 performs a current instruction value generating process. That is, the means generates a current instruction value IM such that a deviation ΔTM between the drive motor torque TM and the target drive motor torque TM* becomes equal to "0", and sends the current instruction value IM to the drive motor 25 so as to correspondingly drive the drive motor 25.

After the engine revolution speed NE is raised by driving the generator motor 16 as described above, an engine ignition processing means (not shown) of the engine control unit 46 performs an engine igniting process. The means determines whether the engine revolution speed NE is greater than the ignition revolution speed Nf. If the engine revolution speed NE is greater than the ignition revolution speed Nf, the means ignites the engine 11. As a result, the engine 11 is driven.

If the generator motor rotation speed NG is low, the efficiency of the generator motor 16 also becomes low. Therefore, if the target generator motor rotation speed NG* becomes equal to or less than 1500 [rpm], the brake B is engaged to stop the generator motor 16, so that the hybrid vehicle is run in a parallel mode.

Thus, since the engine start vehicle speed Ve is set within a range where the engine revolution speed NE does not exceed an upper limit value prescribed by the generator motor torque TG that is needed to raise the engine revolution speed NE to the ignition revolution speed Nf, the engine 11 is immediately started when the vehicle speed V becomes equal to or greater than the engine start vehicle speed Ve. Therefore, when the hybrid vehicle is to be run in the motor-engine drive mode, the engine revolution speed NE can be raised to the ignition revolution speed Nf, so that the engine 11 can be reliably started.

Next described will be the flowchart of FIG. 6.

Step S1: The target output torque calculating process is performed.

Step S2: The target engine operation state setting process is performed.

Step S3: The generator motor control process is performed.

Step S4: The drive motor control process is performed.

Step S5: The generator motor 16 and the drive motor 25 are driven.

Step S6: The engine 11 is started. The process then ends.

Next described will be the flowchart of FIG. 7.

Step S2-1: It is determined whether the vehicle speed V is at least the engine start vehicle speed Ve. If the vehicle speed V is greater than or equal to the engine start vehicle speed Ve, the process proceeds to step S2-2. If the vehicle speed V is less than the engine start vehicle speed Ve, the process ends.

Step S2-2: The target engine revolution speed NE* is set.

Step S2-3: The engine start instruction is outputted to the engine control unit 46. The process then ends.

In the embodiment, the engine 11 is started when the vehicle speed V becomes equal to or greater than the engine start vehicle speed Ve. While the driving of the engine 11 is stopped, the drive motor rotation speed NM and the generator motor rotation speed NG, as well as the vehicle speed V, change in correspondence to the rotation of the output shaft 14, and are variables proportional to the output rotation speed NO. Therefore, the engine 11 may also be started when the drive motor rotation speed NM becomes equal to or greater than an engine start rotation speed as a threshold that is sufficient to start the engine 11. Furthermore, the engine 11 may be started when the generator motor rotation speed NG becomes equal to or greater than an engine start rotation speed as a threshold that is sufficient to start the engine 11.

Another embodiment of the invention will be described. Constructions comparable to those in the foregoing embodiment are represented by comparable reference characters, and will not be described again.

Figure 10:
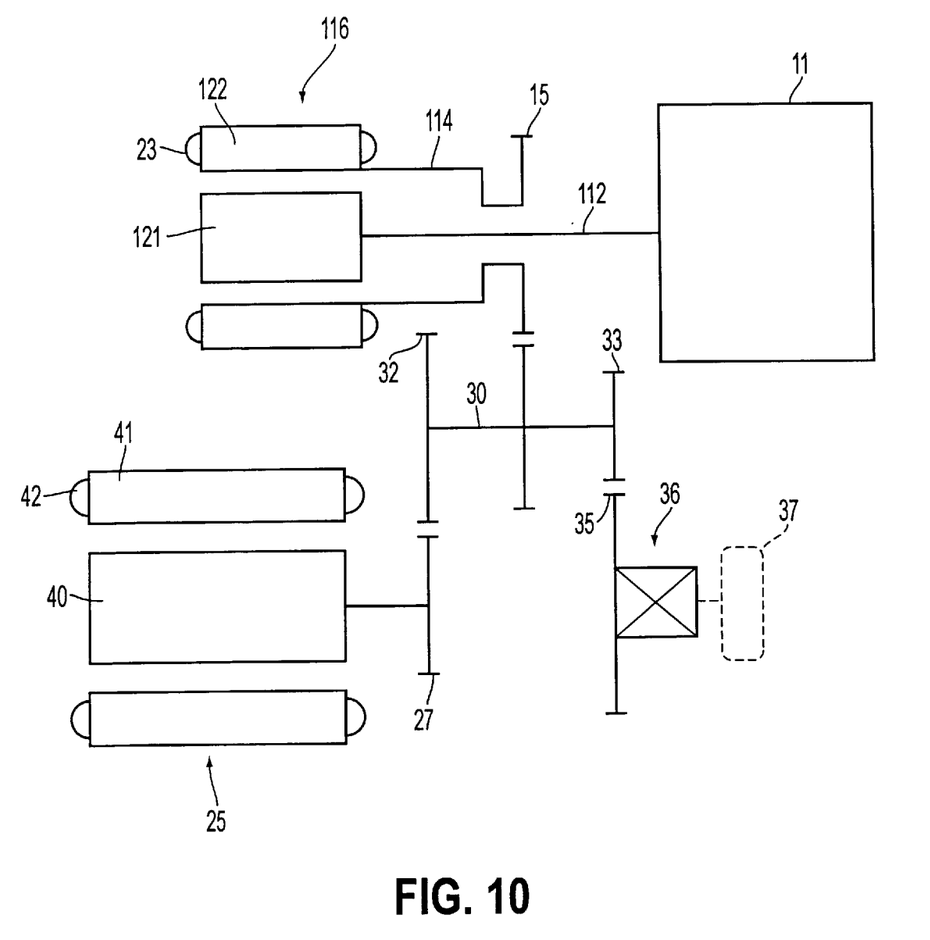
FIG. 10 is a conceptual diagram of a hybrid vehicle in accordance with another embodiment of the invention.

FIG. 10 is a conceptual diagram of a hybrid vehicle in accordance with another embodiment of the invention.

In this embodiment, a rotor 121 of a generator motor 116 as a first electric motor is mechanically connected to an engine 11 via an output shaft 112. A stator 122 of the generator motor 116 is mechanically connected to a first counter drive gear 15 via an output shaft 114.

Therefore, as in the foregoing embodiment, a portion of the engine torque TE can be transferred to the generator motor 116 to generate electric power. Furthermore, rotation produced by driving the generator motor 116 can be transferred to the engine 11 to start the engine 11.

The invention is not limited to the above-described embodiments. Various modifications are possible based on the spirit of the invention, and are not excluded from the scope of the invention.

As described in detail above, according to the invention, a hybrid vehicle includes an engine and a first electric motor mechanically connected to the engine and to a drive wheel, wherein the engine is startable by the first electric motor.

The hybrid vehicle further includes: start condition satisfaction determination processing means for determining whether a variable that varies corresponding to rotation of the drive wheel is equal to or greater than a threshold set within a range that does not exceed an upper limit value prescribed by a maximum torque of the first electric motor and a torque of the first electric motor needed to start the engine; and engine start instruction output processing means for outputting an engine start instruction if the variable is equal to or greater than the threshold.

In this case, if the variable that changes corresponding to the rotation of the output shaft is equal to or greater than the threshold set within the range that does not exceed the upper limit value prescribed by the maximum torque of the first electric motor and the torque of the first electric motor needed to start the engine, the engine start instruction is outputted and the engine is immediately started.

Therefore, the engine revolution speed can be raised to the ignition revolution speed, so that the engine can reliably be started.

While the invention has been described with reference to what are presently considered to be preferred embodiments thereof, it is to be understood that the invention is not limited to the disclosed embodiments or constructions. On the contrary, the invention is intended to cover various modifications and equivalent arrangements. In addition, while the various elements of the disclosed invention are shown in various combinations and configurations, which are exemplary, other combinations and configurations, including more, less or only a single embodiment, are also within the spirit and scope of the invention.

What is claimed is:

1. A hybrid vehicle, comprising:

an engine;

a first electric motor mechanically connected to the engine and to a drive wheel, wherein the engine is startable by the first electric motor;

start condition satisfaction determination processing means for determining whether a variable that varies corresponding to rotation speed of the drive wheel is equal to or greater than a threshold set so as not to exceed an upper limit value prescribed by a maximum torque of the first electric motor and a torque of the first electric motor needed to start the engine; and engine start instruction output processing means for outputting an engine start instruction if the variable is equal to or greater than the threshold.

2. A hybrid vehicle according to claim 1, further comprising:

a second electric motor;

an output shaft mechanically connected to the second electric motor and the drive wheel; and a differential gear device including at least three gear elements that are connected to the engine, the first electric motor and the output shaft, respectively.

3. A hybrid vehicle according to claim 1, wherein the variable is a vehicle speed, and the threshold is an engine start vehicle speed.

4. A hybrid vehicle according to claim 1, wherein the variable is a rotation speed of the first electric motor, and the threshold is an engine start rotation speed.

5. A hybrid vehicle according to claim 1, wherein the threshold is changed corresponding to a state of a battery.

6. A control method of a hybrid vehicle including an engine and a first electric motor mechanically connected to the engine and to a drive wheel, and wherein the engine is startable by the first electric motor, the control method comprising:

determining whether a variable that varies corresponding to rotation speed of the drive wheel is equal to or greater than a threshold set so as not to exceed an upper limit value prescribed by a maximum torque of the first electric motor and a torque of the first electric motor needed to start the engine; and outputting an engine start instruction if the variable is equal to or greater than the threshold.

* * * * *